United States Patent [19]
Copeland et al.

[11] Patent Number: 5,924,031
[45] Date of Patent: Jul. 13, 1999

[54] INTERCONNECTIVE TRANSPONDER SYSTEMS AND METHODS

[75] Inventors: Wilbert B. Copeland, Los Angeles; William L. Ballhaus, Venice; Robert A. Brunner, Redondo Beach; Arnold L. Berman, Los Angeles; Samuel A. Milliken, Playa del Rey, all of Calif.

[73] Assignee: Hughes Electronics Corporation, El Segundo, Calif.

[21] Appl. No.: 08/781,370

[22] Filed: Jan. 21, 1997

[51] Int. Cl.⁶ .................................................. H04B 7/185
[52] U.S. Cl. ........................... 455/428; 455/12.1; 455/17; 455/22
[58] Field of Search ................................... 455/427, 428, 455/11.1, 12.1–13.1, 13.2, 17, 19, 22, 13.3, 7, 560, 561, 562, 272, 550, 102–103; 370/310, 315, 357, 360

[56] References Cited

U.S. PATENT DOCUMENTS

| | | | |
|---|---|---|---|
| 4,228,401 | 10/1980 | Wachs et al. | 455/22 |
| 5,613,197 | 3/1997 | Copeland et al. | 455/20 |
| 5,809,398 | 9/1998 | Moberg et al. | 455/17 |

OTHER PUBLICATIONS

*Modern Dictionary of Electronics,* Graf, Rudolf F., SAMS, Carmel, Indiana, sixth edition, 1991, p. 213.

U.S. Patent Application Serial No. 08/334,491; filed Nov. 3, 1994 in the name of Copeland Wilbert B., et al. and assigned to Hughes Electronics.

*Primary Examiner*—Doris H. To
*Attorney, Agent, or Firm*—Georgann S. Grunebach; M. W. Sales

[57] ABSTRACT

Transponder systems are disclosed for routing signals from a plurality of input frequency channels at each of a plurality of receive antennas to a plurality of output frequency channels at each of a plurality of transmit antennas. The routing is preferably processed at an intermediate frequency. A plurality of bandpass filters are coupled to each receive antenna to define input signal paths. First and second mixers are positioned in series with each bandpass filter. A mixing signal at the first mixer adjusts the frequency of a selected one of the input signals to pass it through the bandpass filter and onto the respective input signal path. A mixing signal on the second mixer translates the frequency of that input signal to have a frequency order in the intermediate frequency band that corresponds with the frequency order of a selected one of the output frequency channels at its respective transmit antenna. Each of the transmit antennas is coupled to a common signal path of an adder. The adder has a plurality of intermediate signal paths which are each connected through a plurality of switches to a selected one of the input signal paths.

28 Claims, 5 Drawing Sheets

INTERCONNECTIVE TRANSPONDER SYSTEMS AND METHODS

BACKGROUND OF THE INVENTION

1. Field of the Invention

The present invention relates generally to transponders and more particularly to satellite transponders.

2. Description of the Related Art

Figures 1, 2:
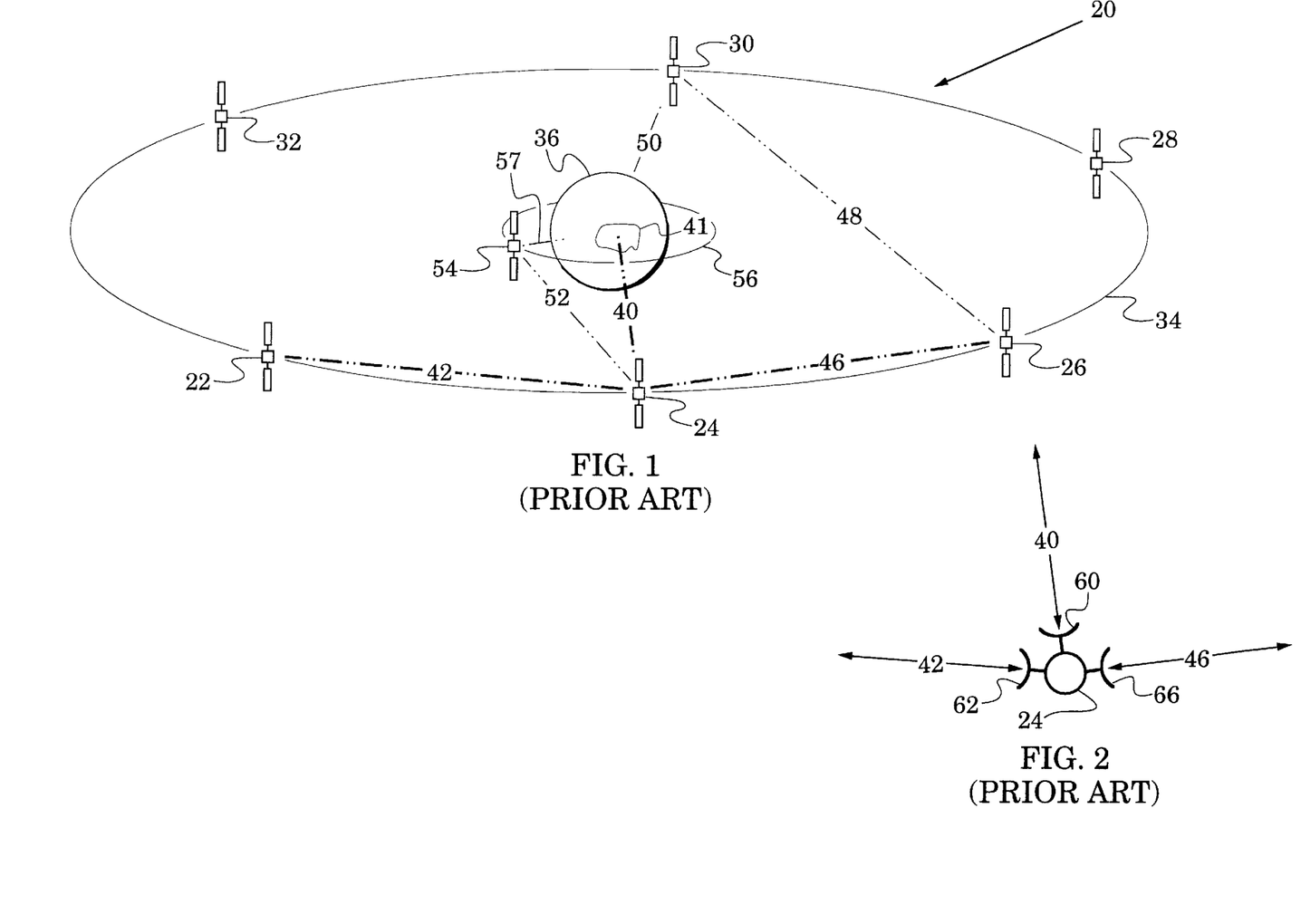
FIG. 1 is a perspective view of geostationary satellites and communication links between the satellites.
FIG. 2 is an enlarged view of one of the satellites of FIG. 1 with its associated communication links.

Transponders are widely used in a variety of communication systems, e.g., the satellite communication system 20 of FIG. 1. In this communication system, a plurality of satellites 22, 24, 26, 28, 30 and 32 are stationed in a geostationary orbit (GEO) 34 about the Earth 36. These satellites and coverage areas on the Earth 36 can all be interconnected by communication links (a coverage area is that portion of the Earth's surface that is intersected by a satellite antenna beam). In particular, the satellite 24 is shown to have a communication link 40 with a coverage area 41 on the Earth 36 and communication links 42 and 46 with satellites 22 and 26 respectively.

Such communication systems are useful in various communication interconnections. For example, the system 20 can include a communication link 48 to the satellite 30 and a communication link 50 from that satellite to an out-of-sight coverage area on the Earth. This extended system can couple communications between the coverage area 41 and the out-of-sight coverage area. As a second example, the system can also include a communication link 52 to a reconnaissance satellite 54 that is in a low Earth orbit 56. The satellite 54 gathers data through a reconnaissance link 57 and transfers that data on a real-time basis to the out-of-sight coverage area through the system 20.

Typically, each of the communication links has a plurality of frequency channels. Communication versatility is enhanced if the satellite 24 can receive a signal in a frequency channel of one communication link, e.g., link 40, and route the signal so that it is transmitted on a selected frequency channel of another communication link, e.g., link 46.

FIG. 2 is an enlarged view of the satellite 24 with its communication links 40, 42 and 46 coupled respectively through antennas 60, 62 and 66. Each of these antennas can be used for receiving and transmitting signals, e.g., with different polarizations, from different satellites or coverage areas. Alternatively, each antenna symbol may represent a pair of receive and transmit antennas.

Figure 3:
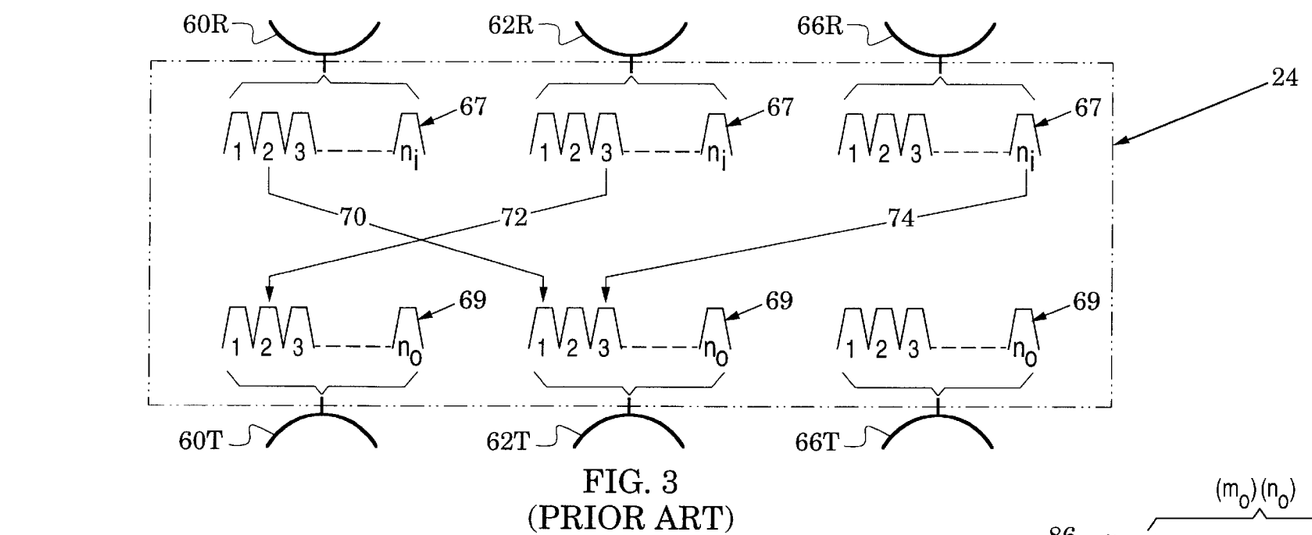
FIG. 3 is a schematic diagram of receive antennas and input frequency channels and transmit antennas and output frequency channels in the satellite of FIG. 2.

The latter arrangement is illustrated in FIG. 3 in which the receive antennas are referenced as 60R, 62R and 66R and the transmit antennas as 60T, 62T and 66T. As schematically indicated, each of the receive antennas receives signals in $n_i$ input frequency channels 67 and each of the transmit antennas transmits signals in no output frequency channels 69. The frequency channels are shown in ascending frequency order, e.g., $n_i$ is the highest frequency input channel.

Three exemplary routing paths 70, 72 and 74 are shown. Signal 70 is routed from input frequency channel 2 at receive antenna 60R to output frequency channel 1 at transmit antenna 62T. Signal 72 is routed from input frequency channel 3 at receive antenna 62R to output frequency channel 2 at transmit antenna 60T. Signal 74 is routed from input frequency channel $n_i$ at receive antenna 66R to output frequency channel 3 at transmit antenna 62T. At another instant in time, the signals 70, 72 and 74 may be routed to different output frequency channels. Preferably, a signal from any of the $n_i$ input frequency channels can be routed to any selected one of the $n_o$ output frequency channels.

Figure 4:
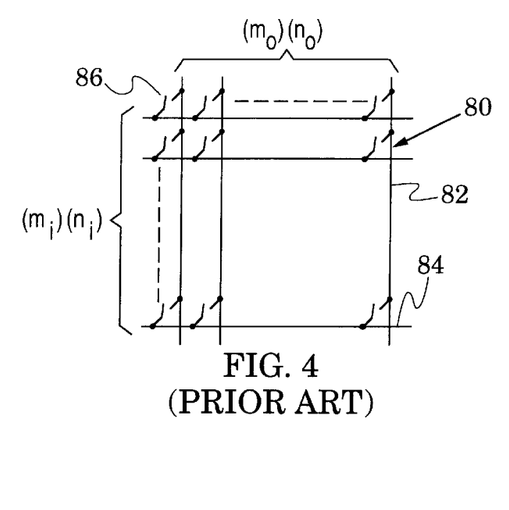
FIG. 4 is a schematic diagram of a conventional crossbar switch.

A conventional transponder structure for performing this function is the crossbar switch 80 of FIG. 4. As defined in various references (e.g., *Modern Dictionary of Electronics*, Graf, Rudolf F., SAMS, Carmel, Ind., sixth edition, 1991, p 213) and referenced in FIG. 4, a crossbar switch is a switching system having a plurality of input paths 82, a plurality of output paths 84 and a matrix of switches 86 (e.g., electromagnetically or electronically operated switches) for interconnecting any one of the input paths with any one of the output paths. The input paths 82 and output paths 84 are generally connected to input and output ports of the crossbar switch.

The communication links of FIGS. 1 and 2 are typically microwave links, e.g., X band and Ku band. If the crossbar switch 80 were used to route signals in the satellite 24 of FIG. 3, the signals would preferably be processed in an intermediate frequency band at which the switches 86 can be more easily and economically fabricated. In this satellite configuration, downconversion and upconversion operations would be associated respectively with the receive antennas and the transmit antennas.

Although the crossbar switch 80 could perform the routing operations of FIG. 3, its structure would be complex and expensive. In general, if the satellite 24 has $n_i$ input frequency channels at each of $m_i$ receive antennas and $n_o$ output frequency channels at each of $m_o$ transmit antennas, the crossbar switch 80 would require $m_i n_i$ input paths 82, $m_o n_o$ output paths 84 and $(m_i n_i)(m_o n_o)$ switches 86. For example, if $m_i = m_o = 3$ and $n_i = n_o = 50$, the crossbar switch 80 would have 22,500 of the switches 86.

Another transponder system was disclosed in copending U.S. patent application Ser. No. 08/334,491 which was filed Nov. 3, 1994 in the name of Copeland, Wilbert B., et al. and assigned to Hughes Electronics, the assignee of the present invention. This system includes a plurality of channel control units (CCU) which downconvert a band of signals to an intermediate frequency for efficient filtering and separation, and then, subsequently, individually reconvert the signals back to the output microwave band. This configuration did not originally envision any rearrangement or recombination of the signals within the common bandwidth.

SUMMARY OF THE INVENTION

The present invention is directed to the routing of an unprecedented amount of satellite communications traffic between users in multiple service areas. The invention discloses a novel approach to routing satellite communication traffic. This routing approach is based on a Common Intermediate Frequency architecture that enables the traffic routing task to be partitioned into a number of smaller routing tasks. As a result of this partitioning, the routing approach described herein significantly reduces, relative to current routing approaches, the satellite resources required to perform the necessary routing function.

The invention is applicable to any satellite routing problem that involves mapping $n_i$ channels coming into the satellite from m coverage areas, to $o_i$ channels and p output coverage areas. For the purposes of simplicity, without losing generality, this problem description will assume that m=p (number of input coverage areas is equal to the number of output coverage areas), and that the number of channels coming from and going to each coverage area is equal ($o_i$–$n_i$=n).

The conventional approach to solving this problem would involve forming a routing/switching unit comprising n*m inputs and n*m outputs. The corresponding switch unit would contain $n^2*m^2$ switching elements. For example, a satellite with 3 coverage areas and 50 input and output signals per coverage area would need to support a switching unit with 150*150 or 22,500 elements.

The invention, however, reduces the number of switching elements significantly, thus reducing the amount of valuable satellite resources needed to provide the routing capability. Specifically, for the example containing 3 coverage areas each with 50 input and output signals, the number of switching elements required in one routing embodiment is 450.

The invention significantly reduces the complexity and weight of repeaters that require significant switching and routing capabilities. The reduced complexity and the use of common filtering hardware, made possible by use of common IF filtering, will result in lower cost payloads. This reduced cost, along with the reduced weight, will enable a more competitive product in the market place.

Figure 5:
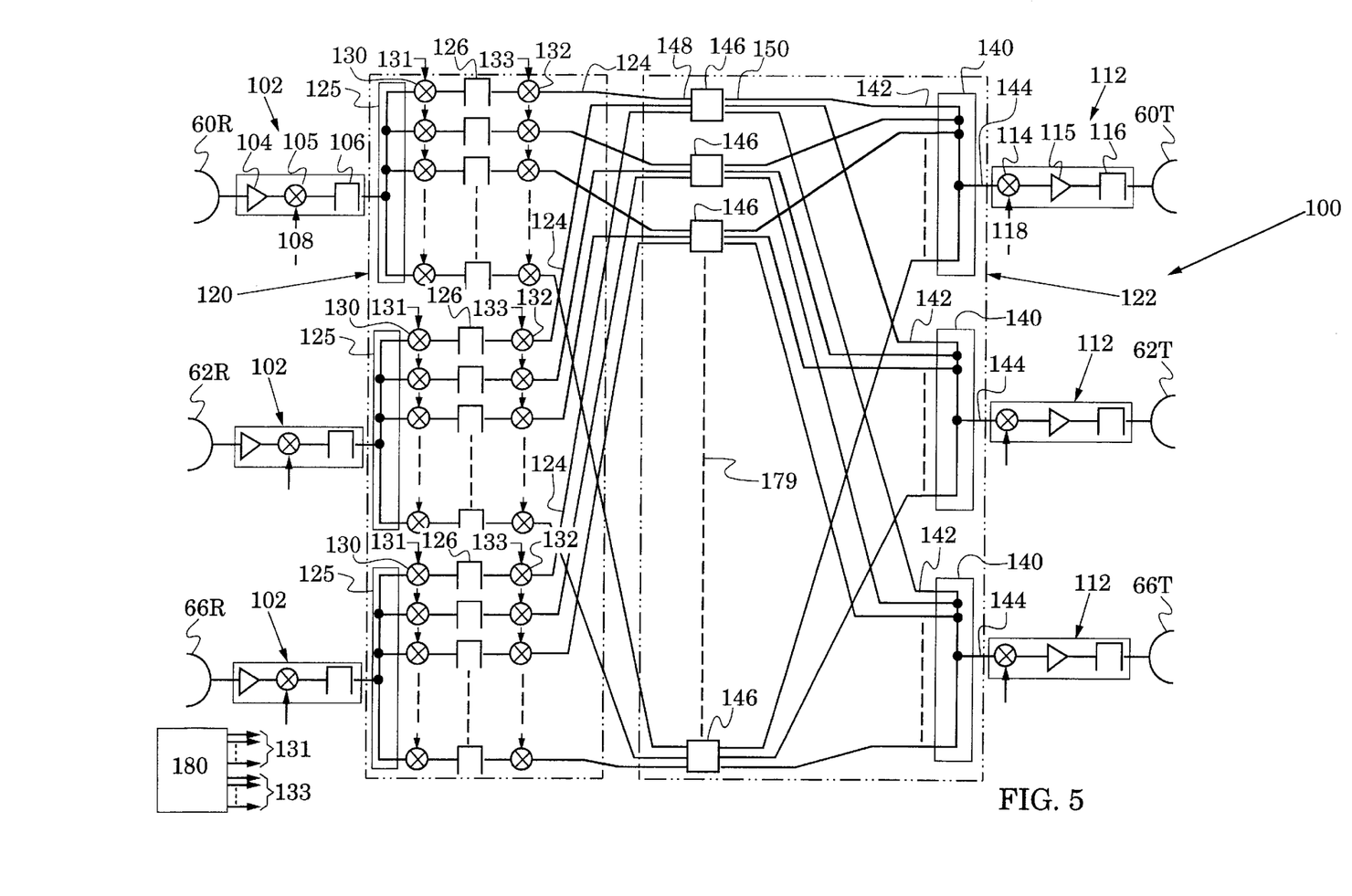
FIG. 5 is a block diagram of a transponder system in accordance with the present invention.

FIG. 5 illustrates one architectural embodiment upon which this invention is based. The satellite receives a signal, containing n channels, from each coverage area. The n channels are ultimately "reorganized", routed to the appropriate destination coverage area, and then transmitted. To efficiently perform this routing function, the received signals are first block downconverted to a common intermediate frequency (IF) band. The signals are then "divided", frequency adjusted, and then filtered, resulting in a partitioning of the signal into n channels at the same IF frequency. The frequency of each mixer is individually adjusted so that n distinct channels are presented at the output of the n filters (any of the n channels can be "routed" to the output of any of the n filters). After being filtered out from the received signal, the channels are then frequency adjusted by a second mixer so that, given their destination coverage area, they will be positioned at a location in the IF band that corresponds to their desired destination channel. Consequently, prior to the channels being input into any switching unit, a portion of the routing function has already been performed. After this second frequency adjustment, the n channels are then each inputted into a 1×m switching unit to send the channel to its coverage area destination. At this point the routing is complete.

The channels to be transmitted to each coverage area are then combined, block upconverted to the appropriate transmit frequency, and then transmitted.

Figure 6:
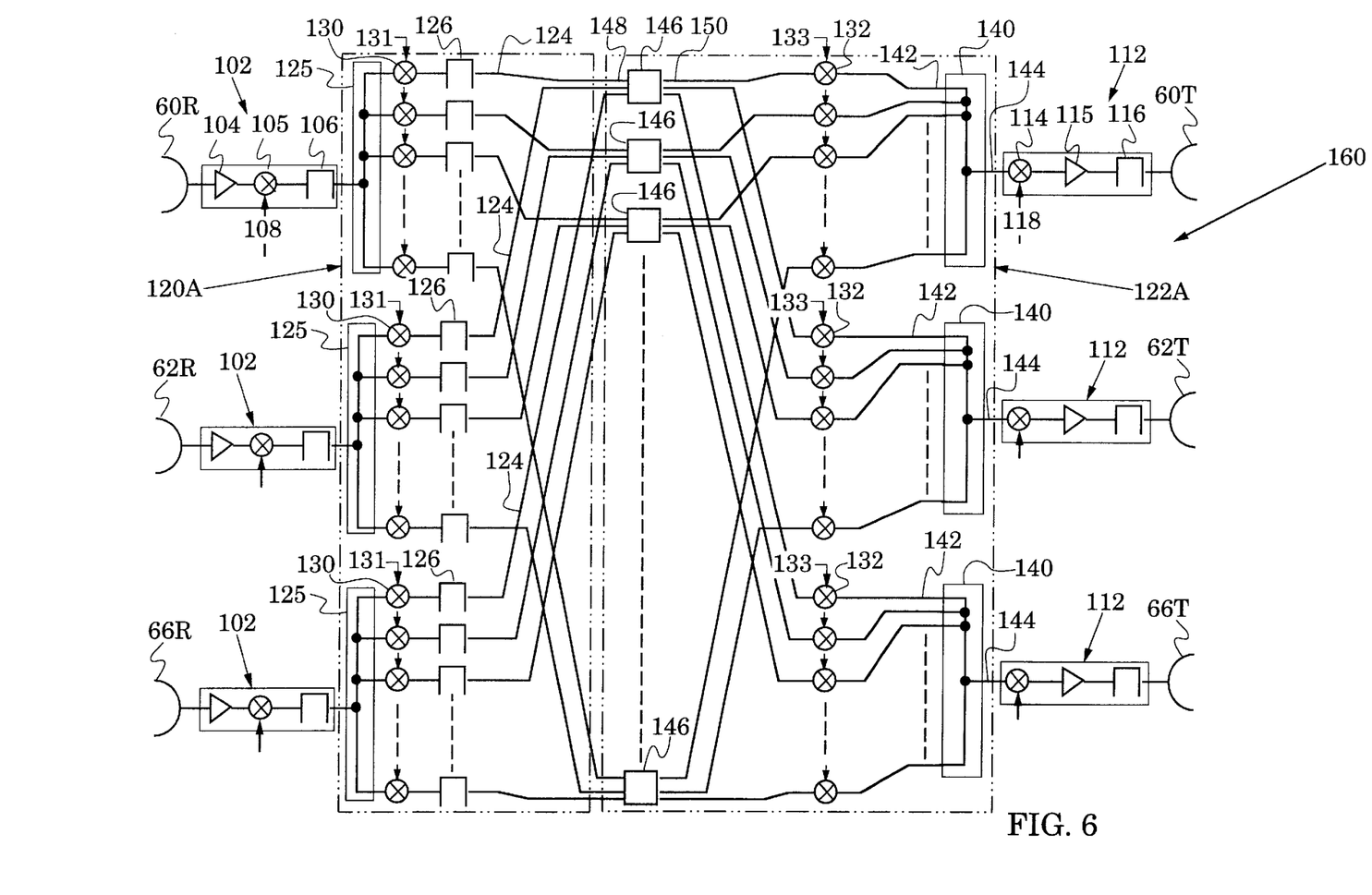
FIG. 6 is a block diagram of another transponder system.
Figure 7:
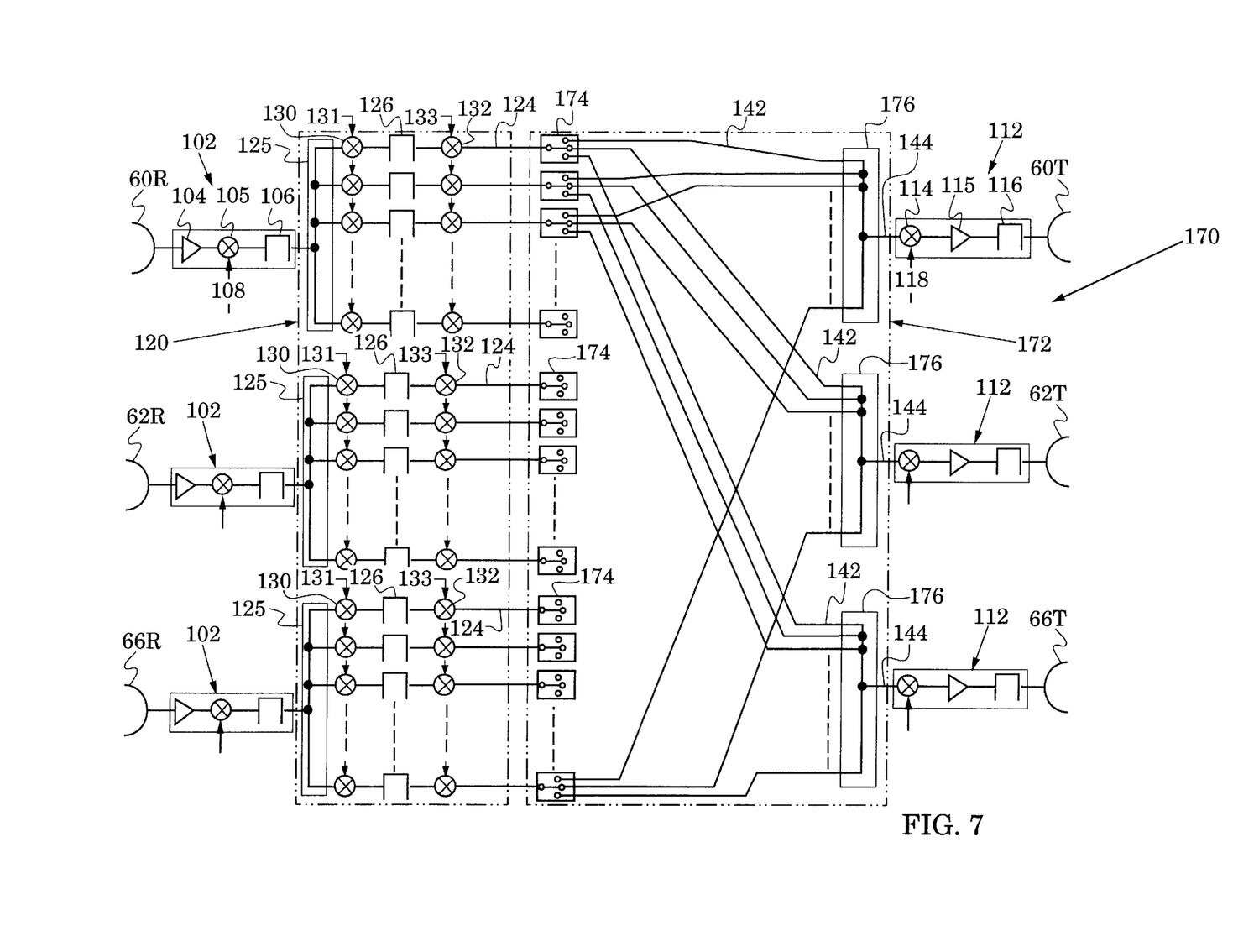
FIG. 7 is a block diagram of another transponder system.

FIG. 6 illustrates another transponder embodiment in which the switching and the second mixing operations are interchanged and FIG. 7 shows another transponder embodiment with a further rearrangement of the switching function.

The novel features of the invention are set forth with particularity in the appended claims. The invention will be best understood from the following description when read in conjunction with the accompanying drawings.

DETAILED DESCRIPTION OF THE PREFERRED EMBODIMENTS

A transponder 100 in accordance with the present invention is shown in FIG. 5. It includes the receive antennas 60R, 62R and 66R and the transmit antennas 60T, 62T and 66T of the satellite 24 of FIG. 3. The transponder 100 selectively routes signals from input frequency channels (67 in FIG. 3) at each of the receive antennas to output frequency channels (69 in FIG. 3) at each of the transmit antennas.

Coupled to each of the receive antennas is a downconverter 102 which has a low noise amplifier 104, a mixer 105 and a bandpass filter 106 connected in series. Input signals in the input frequency channels are downconverted to an intermediate frequency band with a local oscillator signal 108 which is inserted into the mixer 105. The filter 106 is configured to pass the downconverted input signals and attenuate the amplitude of spurious signals which are out of the intermediate frequency band.

Coupled to each of the transmit antennas is an upconverter 112 which has a mixer 114, a power amplifier 115 and a bandpass filter 116 connected in series. Signals in the intermediate frequency band are upconverted to the output frequency channels (69 in FIG. 3) with a local oscillator signal 118 which is inserted into the mixer 114. The filter 116 is configured to pass the upconverted output signals and attenuate the amplitude of spurious signals which are outside of the output frequency channels. For clarity of illustration, the upconverter and downconverter elements are referenced in FIG. 5 for only the receive antenna 60R and the transmit antenna 60T.

Signal routing between the downconverters 102 and the upconverters 112 is accomplished with a first routing structure 120 connected in series with a second routing structure 122. The first routing structure routes each signal from the input frequency channels along a respective signal path and translates its frequency to have a frequency order that corresponds with the frequency order of a selected one of the output frequency channels. The second routing structure 122 couples selected ones of the signal paths to a common signal path at the input of each upconverter mixer 114.

The elements of the first routing structure 120 are now described with reference to receive antenna 60R. These elements are also provided for each of the other receive antennas 62R and 64R. The first routing structure 120 provides an input signal path 124 for each of the signals of the input frequency channels (67 in FIG. 3) of receive antenna 60R. Each of these signal paths 124 is coupled to the bandpass filter 106 of the downconverter 102 by a signal divider 125 and each passes through a respective bandpass filter 126.

Each input signal path 124 also passes through first and second mixers 130 and 132 which are positioned on opposite sides of the bandpass filter 126. Local oscillator signals 131 and 133 are provided respectively for the first and second mixers 130 and 132. For clarity of illustration these elements are only referenced for one path 124 from each of the downconverters 102.

Attention is now directed to the operation of the first routing structure 120 with respect to downconverted input signals from the receive antenna 60R. The local oscillator signal 131 at each first mixer 130 is selected to adjust the frequency of a respective one of the input signals so that it passes through the bandpass filter 126 associated with that first mixer. In particular, an upper and a lower sideband signal are produced at each of the first mixers 130 and the local oscillator signal 131 is selected to pass a selected one of the sideband signals through the bandpass filter 126. Sideband signals of others of the input signals are rejected by the bandpass filter 126. Thus, each bandpass filter 126 essentially defines its respective input signal path 124 by forming a gate for the passage of a selected input signal.

From each bandpass filter 126, a selected input signal passes to a second mixer 132 and the local oscillator signal 133 of that mixer is selected to translate the frequency of the input signal so that it has a specific frequency order. In particular, a frequency order in the intermediate frequency band that corresponds with the frequency order of a selected one of the output frequency channels (69 in FIG. 3). The undesired sideband signal of this process is blocked by the bandpass filter 116 of a respective one of the upconverters 112.

Using input signal 70 of FIG. 3 as an example, this signal is now routed onto one of the input signal paths 124 and its frequency is translated to have a frequency order in the intermediate frequency band that corresponds to the frequency order of output frequency channel 1 at transmit antenna 62T.

Therefore, after the input signals from the receive antenna 60R have been processed through the first routing structure 120, each input signal has been routed onto a respective one of the input signal paths 124 and has been selectively permuted, i.e., it has a frequency order in the intermediate frequency band that corresponds with the frequency order of a selected one of the output frequency channels (69 in FIG. 3) at a selected one of the transmit antennas 60T, 62T and 66T.

Because of the functions of their respective mixers, the local oscillator signals 131 and 133 may be generally referred to as mixing signals and specifically referred to as frequency adjusting signals 131 and frequency translating signals 133. The operation of the the first routing structure 120 for downconverted input signals of the receive antennas 62R and 66R is similar to the operation described above.

The processed input signals pass from the first routing structure 120 into the second routing structure 122. This latter structure has signal adders 140 which each join a plurality of broadband intermediate signal paths 142 to a common signal path 144. An adder 140 is provided for each upconverter 112 and the common signal path 144 is coupled to the upconverter's mixer 114. The second routing structure 122 also has a plurality of crossbar switches 146 which are conceptually similar to the crossbar switch 80 of FIG. 4.

Each crossbar switch 146 has input ports 148 and output ports 150. In a first one of the crossbar switches 146, one input signal path 124 from each of the downconverter bandpass filters 106 is coupled to a respective one of the input ports 148. In this same crossbar switch, one intermediate signal path 142 from each of the adders 140 is coupled to a respective one of the output ports 150.

In general, this crossbar switch has $m_i$ input ports and $m_o$ output ports in which $m_i$ and $m_o$ are the number respectively of receive and transmit antennas. Because $m_i=m_o=3$ in the transponder 100, this first crossbar switch 146 has three input ports 148 and three output ports 150. The remainder of the crossbar switches 146 are coupled to the input signal paths 124 and the intermediate signal paths 142 in a similar manner. Because each of the input signal paths 124 associated with a receive antenna is coupled to a different crossbar switch 146, $n_i$ of the crossbar switches are required in which $n_i$ is the largest number of channels in any of the input frequency channels (67 of FIG. 3).

In operation of the second routing structure 122, selected ones of the input signal paths 124 are coupled to the common signal path 144 of each signal adder 140. This is accomplished by connecting each intermediate signal path 142 through its respective crossbar switch 146 to a selected one of the input signal paths 124. Signals thus placed on the common signal paths 144 are then upconverted to the output frequency channels by the upconverters 112.

Input signals 70 and 74 of FIG. 3 can be used to illustrate processing of the routing structures 120 and 122. In this example, signal 70 is passed through one of the bandpass filters 126 associated with receive antenna 60R. This is done by properly selecting the frequency of the frequency adjusting signal 131 of that bandpass filter's respective first mixer 130. The frequency of the signal 70 is then translated to have a frequency order in the intermediate frequency band that corresponds to the frequency order of output frequency channel 1 at transmit antenna 62T. This is done by properly selecting the frequency of the frequency translating signal 133 of that bandpass filter's respective second mixer 132.

This process is repeated for the signal 74 to place it on one of the input signal paths 124 associated with receive antenna 66R. The frequency of the signal 74 is then translated to have a frequency order in the intermediate frequency band that corresponds to the frequency order of output frequency channel 3 at transmit antenna 62T.

With the signals 70 and 74 in the proper frequency order (i.e., properly transmuted), they are processed by the routing structure 122 to place them both on the common signal path 144 of the adder 140 which is associated with the transmit antenna 62T. This is done by connecting appropriate intermediate signal paths 142 of this adder with the input signal paths 124 which carry signals 70 and 74. This connecting operation is accomplished with the crossbar switches 146 associated with those signal paths 124.

FIG. 6 illustrates another transponder 160 which is similar to the transponder 100 with like elements indicated by like reference numbers. In the transponder 160, the second mixers 132 and their frequency translation function have been moved from the input signal paths 124 to the intermediate signal paths 142 of the signal adders 140. Accordingly, the transponder 160 has a first routing structure 120A and a second routing structure 122A which are respectively similar to the first routing structure 120 and second routing structure 122 of FIG. 5 except for the interchange of the second mixers 132. The transponder 160 performs the same routing functions as the transponder 100 but in a different order. The transponder 160 illustrates that the translation process of the second mixers 132 can be interchanged with the connecting process of the crossbar switches 146.

FIG. 7 illustrates another transponder 170 which is similar to the transponder 100 of FIG. 5 with like elements indicated by like reference numbers. The first routing structure 120 of the transponder 170 is identical to the first routing structure 120 of the transponder 100. However, the second routing structure 172 of the transponder 170 includes three-position switches 174 rather than the crossbar switches 146 of the transponder 100.

Each of the input signal paths 124 associated with the receive antenna 60R is connected to a respective one of the switches 174. Two other sets of the switches 174 are similarly connected to the signal paths 124 of the receive antennas 62R and 64R. In general, $n_i m_i$ of the switches 174 are required in which $n_i$ is the number of input frequency channels (67 of FIG. 3) and $m_i$ is the number of receive antennas. Also, each switch has $m_o$ switch positions in which $m_o$ is the number of transmit antennas.

In addition, the second routing structure 172 includes adders 176 in place of the adders 140 of the transponder 100. The adders 176 provide an intermediate signal path 142 to each of the $n_i m_i$ switches. Each adder 176 therefore has $n_i m_i$ intermediate signal paths whereas the adders 140 each have $n_i$ intermediate signal paths.

The transponder 170 illustrates that the coupling function of the second routing structure can be accomplished with any coupling structure which can couple the common signal path 144 of each upconverter 112 to any set of $n_o$ selected input signal paths 124 of the first routing structure (i.e., a selected set of $n_o$ of the $n_i m_i$ signal paths 124). Expressed differently, the coupling function can be accomplished with any coupling structure which can couple each input signal path 124 to any of the $m_o$ upconverters 112.

Transponders of the invention provide efficient routing of signals from a plurality of input frequency channels at each of a plurality of receive antennas to a plurality of output frequency channels at each of a plurality of transmit antennas. As described above in the related art section, the crossbar switch 80 of FIG. 3 would require 22,500 switches to route signals between 3 receive antennas and 3 transmit antennas that each carry 50 frequency channels. The transponder 100 of FIG. 5 performs this same routing with 50 crossbar switches that each have 9 switches. Thus, the switch count is reduced to 450. The transponder 170 of FIG. 7 performs this same routing with 150 three-position switches by using more complex adders than the transponder 100 (150 intermediate paths vs. 50 intermediate paths). In addition to facilitating a low parts count, transponders of the invention reduce transponder complexity, weight and cost by the use of simple, conventional parts, e.g., filters and mixers.

To further reduce fabrication costs, the bandpass filters 126 (of FIGS. 5, 6 and 7) are preferably all centered at substantially the same frequency. This transponder embodiment facilitates the fabrication of common parts, e.g., common filters. However, the teachings of the invention can apply to other filter frequency patterns. For example, the frequencies of each set of bandpass filters could have the same frequency order and spacing as its respective set of input frequency channels. In this filter embodiment, a common frequency adjusting signal 131 can be applied to the first mixers 130 to pass the input signals through their respective filters.

The downconverters 102 and upconverters 112 of the transponder 100 place the elements of the first and second routing structures 120 and 122 in a lower intermediate frequency band. Typically, fabrication, assembly and test costs are lower at an intermediate frequency band than at the microwave band, e.g., X band or Ku band, of a communications link.

However, the teachings of the invention can also be practiced by realizing the first and second routing structures at microwave frequency and eliminating the downconverters 102 and upconverters 112. Alternatively, the first and second routing structures can be realized at an intermediate frequency band and one or more of the transmit antennas configured to radiate at the intermediate frequency band (thereby eliminating the upconverter 112 at those transmit antennas). Preferably, these antennas would still be preceded with amplification and filtering structures.

Although the receive antennas and transmit antennas of the transponders 100, 160 and 170 of FIGS. 5–7 have been shown as separate antennas, they may also be realized as integral receive-transmit antennas, e.g., with different signal polarization structures.

The conventional dividers 125 and adders 140 and 176 of FIGS. 5–7 can be realized with various standard transmission line techniques, e.g., microstrip and stripline. The frequency adjusting signals 131 and frequency translating signals 133 of FIGS. 5–7 can be provided by any conventional agile frequency source 180 (e.g., a frequency synthesizer) as indicated in the transponder 100 of FIG. 5.

For clarity of illustration, exemplary elements have been shown in FIGS. 5–7 with other element indicated by broken lines, e.g., the broken line 179 in FIG. 5. Also, only exemplary input signal paths 124 and exemplary intermediate signal paths 142 have been shown.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of routing signals from a plurality of input frequency channels at each of a plurality of receive antennas to a plurality of output frequency channels at each of a plurality of transmit antennas, comprising the steps of:

executing the following steps for signals associated with each of said receive antennas:
   a) downconverting said associated signals to an intermediate frequency band;
   b) routing each of said associated signals along a respective one of a plurality of input signal paths; and
   d) translating the frequency of each of said associated signals to have a frequency order in said intermediate frequency band that corresponds with the frequency order of a respective one of said output frequency channels at its respective transmit antenna;

and executing the following steps for each of said transmit antennas:
   a) selecting any set of said input signal paths;
   b) coupling said selected set to a common output signal path; and
   c) upconverting the signals on said common output signal path to said output frequency channels.

2. The method of claim 1, wherein said routing step includes the steps of;

adapting each of said input signal paths to include a respective bandpass filter; and
   prior to said translating step, adjusting the frequency of each of said associated signals to pass that signal through the bandpass filter of its respective input signal path.

3. The method of claim 2, wherein said adjusting step includes the step of frequency converting each of said associated signals with a mixing signal which has a selected frequency.

4. The method of claim 2, wherein said adapting step includes the step of configuring the bandpass filters of all of said input signal paths to be centered about substantially the same frequency.

5. The method of claim 1, wherein said coupling step includes the steps of:

joining a plurality of intermediate signal paths to said common signal path; and connecting each of said selected input signal paths to a respective one of said intermediate signal paths.

6. The method of claim 1, wherein said translating step includes the step of frequency converting each of said associated signals with a mixing signal which has a selected frequency.

7. The method of claim 1, wherein said downconverting step includes the step of filtering said associated signals to reduce the amplitude of any spurious signals.

8. The method of claim 1, wherein said upconverting step includes the step of filtering the signals of said output frequency channels to reduce the amplitude of any spurious signals.

9. A method of routing signals from a plurality of input frequency channels at each of a plurality of receive antennas to a plurality of output frequency channels at each of a plurality of transmit antennas, comprising the steps of:

executing the following steps for signals associated with each of said receive antennas:
 a) routing each of said associated signals along a respective one of a plurality of input signal paths; and
 b) translating the frequency of each of said associated signals to have a frequency order that corresponds with the frequency order of a respective one of said output frequency channels at its respective transmit antenna;

and executing the following steps for each of said transmit antennas;
 a) selecting any set of said input signal paths; and
 b) coupling said selected set to that transmit antenna.

10. The method of claim 9, wherein said routing step includes the steps of;

adapting each of said input signal paths to include a respective bandpass filter; and prior to said translating step, adjusting the frequency of each of said associated signals to pass that signal through the bandpass filter of its respective signal path.

11. The method of claim 10, wherein said adjusting step includes the step of frequency converting each of said associated signals with a mixing signal which has a selected frequency.

12. The method of claim 10, wherein said adapting step includes the step of configuring the bandpass filters of all of said input signal paths to be centered about substantially the same frequency.

13. The method of claim 9, wherein said translating step includes the step of frequency converting each of said associated signals with a mixing signal which has a selected frequency.

14. A transponder for routing signals from a plurality of input frequency channels in each of a plurality of input communication links to a plurality of output frequency channels in each of a plurality of output communication links, comprising:

for processing the signals associated with each of said input communication links,
 a) a receive antenna for receiving said associated signals;
 b) a downconverter coupled to said receive antenna for converting said associated signals to an intermediate frequency band;
 c) a plurality of bandpass filters, each of said bandpass filters coupled to said downconverter to define a respective one of a plurality of input signal paths from said downconverter;
 d) a plurality of first mixers, each of said first mixers arranged in series between said downconverter and a respective one of said bandpass filters and configured to receive a mixing signal to adjust the frequency of a respective one of said associated signals to pass that signal through that bandpass filter; and
 e) a plurality of second mixers, each of said second mixers arranged in series with a respective one of said bandpass filters to receive one of said associated signals from that bandpass filter and configured to receive a mixing signal to translate the frequency of that signal to have a frequency order in said intermediate frequency band that corresponds with the frequency order of a respective one of said output frequency channels at its respective output communication link;

for processing signals associated with each of said output communication links,
 a) an upconverter having a common signal path and configured to upconvert signals on said common signal path to said output frequency channels; and
 b) a transmit antenna coupled to said upconverter to radiate signals received from said upconverter;

and a coupling structure configured to couple any selected set of said input signal paths to the common signal path of the upconverter associated with any one of said output communication links.

15. The transponder of claim 14, wherein all of said bandpass filters are centered about substantially the same frequency.

16. A transponder for routing signals from a plurality of input frequency channels in each of a plurality of input communication links to a plurality of output frequency channels in each of a plurality of output communication links, comprising:

for processing the signals associated with each of said input communication links,
 a) a receive antenna for receiving said associated signals;
 b) a downconverter coupled to said receive antenna for converting said associated signals to an intermediate frequency band;
 c) a plurality of bandpass filters, each of said bandpass filters coupled to said downconverter to define a respective one of a plurality of input signal paths from said downconverter;
 d) a plurality of first mixers, each of said first mixers arranged in series between said downconverter and a respective one of said bandpass filters and configured to receive a mixing signal to adjust the frequency of a selected one of said associated signals to pass that signal through that bandpass filter; and
 e) a plurality of second mixers, each of said second mixers arranged in series with a respective one of said bandpass filters to receive one of said associated signals from that bandpass filter and configured to receive a mixing signal to translate the frequency of that signal to have a frequency order in said intermediate frequency band that corresponds with the frequency order of a selected one of said output frequency channels at its respective output communication link;

for processing signals associated with each of said output communication links, a) an upconverter having a common signal path and configured to upconvert signals on said common signal path to said output frequency channels; and b) a transmit antenna coupled to said upconverter to radiate signals received from said upconverter;

and a coupling structure configured to couple any one of said input signal paths to the common signal path of the upconverter associated with any one of said output communication links;

wherein said coupling structure includes, for each of said output communication links:

an adder having a plurality of intermediate signal paths coupled to said common signal path; and a plurality of switches arranged to connect each of said intermediate signal paths to a selected one of said input signal paths.

17. The transponder of claim 16, wherein said plurality of switches are arranged to form a crossbar switch.

18. A transponder for routing signals from a plurality of input frequency channels in each of a plurality of input communication links to a plurality of output frequency channels in each of a plurality of output communication links, comprising:

for processing the signals associated with each of said input communication links, a) a receive antenna for receiving said associated signals;

b) a downconverter coupled to said receive antenna for converting said associated signals to an intermediate frequency band;

c) a plurality of bandpass filters, each of said bandpass filters coupled to said downconverter to define a respective one of a plurality of input signal paths from said downconverter;

d) a plurality of first mixers, each of said first mixers arranged in series between said downconverter and a respective one of said bandpass filters and configured to receive a mixing signal to adjust the frequency of a selected one of said associated signals to pass that signal through that bandpass filter; and e) a plurality of second mixers, each of said second mixers arranged in series with a respective one of said bandpass filters to receive one of said associated signals from that bandpass filter and configured to receive a mixing signal to translate the frequency of that signal to have a frequency order in said intermediate frequency band that corresponds with the frequency order of a selected one of said output frequency channels at its respective output communication link;

for processing signals associated with each of said output communication links, a) an upconverter having a common signal path and configured to upconvert signals on said common signal path to said output frequency channels; and b) a transmit antenna coupled to said upconverter to radiate signals received from said upconverter;

and a coupling structure configured to couple any one of said input signal paths to the common signal path of the upconverter associated with any one of said output communication links;

wherein said downconverter includes:

an amplifier configured to amplify said associated signals;

a mixer connected in series with said amplifier and configured to receive a local oscillator signal for downconverting said associated signals to said intermediate frequency band; and a bandpass filter connected in series with said mixer to reduce the amplitude of spurious signals outside of said intermediate frequency band.

19. A transponder for routing signals from a plurality of input frequency channels in each of a plurality of input communication links to a plurality of output frequency channels in each of a plurality of output communication links, comprising:

for processing the signals associated with each of said input communication links, a) a receive antenna for receiving said associated signals;

b) a downconverter coupled to said receive antenna for converting said associated signals to an intermediate frequency band;

c) a plurality of bandpass filters, each of said bandpass filters coupled to said downconverter to define a respective one of a plurality of input signal paths from said downconverter;

d) a plurality of first mixers, each of said first mixers arranged in series between said downconverter and a respective one of said bandpass filters and configured to receive a mixing signal to adjust the frequency of a selected one of said associated signals to pass that signal through that bandpass filter; and e) a plurality of second mixers, each of said second mixers arranged in series with a respective one of said bandpass filters to receive one of said associated signals from that bandpass filter and configured to receive a mixing signal to translate the frequency of that signal to have a frequency order in said intermediate frequency band that corresponds with the frequency order of a selected one of said output frequency channels at its respective output communication link, for processing signals associated with each of said output communication links, a) an upconverter having a common signal path and configured to upconvert signals on said common signal path to said output frequency channels; and b) a transmit antenna coupled to said upconverter to radiate signals received from said upconverter;

and a coupling structure configured to couple any one of said input signal paths to the common signal path of the upconverter associated with any one of said output communication links;

wherein said upconverter includes:

a mixer configured to receive a local oscillator signal for upconverting said intermediate frequency band to said output frequency channels;

an amplifier coupled to said mixer to amplify signals in said output frequency channels; and a bandpass filter connected in series with said amplifier to reduce the amplitude of any spurious signals outside of said output frequency channels.

20. A transponder for routing signals from a plurality of input frequency channels in each of a plurality of input communication links to a plurality of output frequency channels in each of a plurality of output communication links, comprising:

for processing the signals associated with each of said input communication links,
  a) a receive antenna for receiving said associated signals;
  b) a plurality of bandpass filters, each of said bandpass filters coupled to said receive antenna to define a respective one of a plurality of input signal paths from said receive antenna;
  c) a plurality of first mixers, each of said first mixers arranged in series between said receive antenna and a respective one of said bandpass filters and configured to receive a mixing signal to adjust the frequency of a respective one of said associated signals to pass that signal through that bandpass filter; and
  d) a plurality of second mixers, each of said second mixers arranged in series with a respective one of said bandpass filters to receive one of said associated signals from that bandpass filter and configured to receive a mixing signal to translate the frequency of that signal to have a frequency order that corresponds with the frequency order of a respective one of said output frequency channels at its respective output communication link;
for processing signals associated with each of said output communication links, a transmit antenna having a common signal path and configured to radiate signals on said common signal path;
and
a coupling structure configured to couple any selected set of said input signal paths to the common signal path of the transmit antenna associated with any one of said output communication links.

21. The transponder of claim 20, wherein all of said bandpass filters are centered about substantially the same frequency.

22. A transponder for routing signals from a plurality of input frequency channels in each of a plurality of input communication links to a plurality of output frequency channels in each of a plurality of output communication links, comprising:
for processing the signals associated with each of said input communication links,
  a) a receive antenna for receiving said associated signals;
  b) a plurality of bandpass filters, each of said bandpass filters coupled to said receive antenna to define a respective one of a plurality of input signal paths from said receive antenna;
  c) a plurality of first mixers, each of said first mixers arranged in series between said receive antenna and a respective one of said bandpass filters and configured to receive a mixing signal to adjust the frequency of a selected one of said associated signals to pass that signal through that bandpass filter; and
  d) a plurality of second mixers, each of said second mixers arranged in series with a respective one of said bandpass filters to receive one of said associated signals from that bandpass filter and configured to receive a mixing signal to translate the frequency of that signal to have a frequency order that corresponds with the frequency order of a selected one of said output frequency channels at its respective output communication link;
for processing signals associated with each of said output communication links, a transmit antenna having a common signal path and configured to radiate signals on said common signal path;
and
a coupling structure configured to couple any one of said input signal paths to the common signal path of the transmit antenna associated with any one of said output communication links;
wherein said coupling structure includes, for each of said output communication links:
  an adder having a plurality of intermediate signal paths coupled to said common signal path; and
  a plurality of switches arranged to connect each of said intermediate signal paths to a selected one of said input signal paths.

23. The transponder of claim 22, wherein said plurality of switches are arranged to form a crossbar switch.

24. A satellite system for routing signals from a plurality of input frequency channels in each of a plurality of input communication links to a plurality of output frequency channels in each of a plurality of output communication links, comprising:
a satellite; and
a transponder carried by said satellite, said transponder including; for processing the signals associated with each of said input communication links,
  a) a receive antenna for receiving said associated signals;
  b) a plurality of bandpass filters, each of said bandpass filters coupled to said receive antenna to define a respective one of a plurality of input signal paths from said receive antenna;
  c) a plurality of first mixers, each of said first mixers arranged in series between said receive antenna and a respective one of said bandpass filters and configured to receive a mixing signal to adjust the frequency of a respective one of said associated signals to pass that signal through that bandpass filter; and
  d) a plurality of second mixers, each of said second mixers arranged in series with a respective one of said bandpass filters to receive one of said associated signals from that bandpass filter and configured to receive a mixing signal to translate the frequency of that signal to the frequency of a respective one of said output frequency channels at its respective output communication link;
for processing signals associated with each of said output communication links, a transmit antenna having a common signal path and configured to radiate signals on said common signal path;
and
a coupling structure configured to couple any selected set of said input signal paths to the common signal path of the transmit antenna associated with any one of said output communication links.

25. A satellite system for routing signals from a plurality of input frequency channels in each of a plurality of input communication links to a plurality of output frequency channels in each of a plurality of output communication links, comprising:
a satellite; and
a transponder carried by said satellite, said transponder including; for processing the signals associated with each of said input communication links,
  a) a receive antenna for receiving said associated signals;

b) a plurality of bandpass filters, each of said bandpass filters coupled to said receive antenna to define a respective one of a plurality of input signal paths from said receive antenna;

c) a plurality of first mixers, each of said first mixers arranged in series between said receive antenna and a respective one of said bandpass filters and configured to receive a mixing signal to adjust the frequency of a selected one of said associated signals to pass that signal through that bandpass filter; and d) a plurality of second mixers, each of said second mixers arranged in series with a respective one of said bandpass filters to receive one of said associated signals from that bandpass filter and configured to receive a mixing signal to translate the frequency of that signal to the frequency of a selected one of said output frequency channels at its respective output communication link;

for processing signals associated with each of said output communication links, a transmit antenna having a common signal path and configured to radiate signals on said common signal path;

and a coupling structure configured to couple any one of said input signal paths to the common signal path of the transmit antenna associated with any one of said output communication links;

wherein said coupling structure includes, for each of said output communication links:
an adder having a plurality of intermediate signal paths coupled to said common signal path; and
a plurality of switches arranged to connect each of said intermediate signal paths to a selected one of said input signal paths.

26. The satellite system of claim 25, wherein said plurality of switches are arranged to form a crossbar switch.

27. The satellite system of claim 26, wherein all of said bandpass filters are centered about substantially the same frequency.

28. The satellite system of claim 25, further including:

for processing the signals associated with each of said input communication links, a downconverter coupled between said receive antenna and said first mixers to convert said associated signals to an intermediate frequency band; and for processing signals associated with each of said output communication links, an upconverter coupled between said coupling structure and said transmit antenna to convert said intermediate frequency band to said output frequency channels.

* * * * *